United States Patent [19]
Kohn

[11] Patent Number: 5,769,026
[45] Date of Patent: Jun. 23, 1998

[54] CAT LITTER ENCLOSURE

[76] Inventor: Lawrence Kohn, 161 N. Arnaz Dr., Beverly Hills, Calif. 90211

[21] Appl. No.: 772,398

[22] Filed: Dec. 23, 1996

[51] Int. Cl.⁶ .................................................. A01K 1/035
[52] U.S. Cl. ............................................................ 119/165
[58] Field of Search ................................. 119/161, 163, 119/165, 496, 706; 482/35, 36; D30/161; D21/244, 245

[56] References Cited

U.S. PATENT DOCUMENTS

| | | | |
|---|---|---|---|
| 503,107 | 4/1893 | Satcher et al. | 119/496 |
| 3,561,757 | 2/1971 | Schillig | 482/35 |
| 3,618,568 | 11/1971 | Breeden | 119/482 |
| 3,885,523 | 5/1975 | Coleman | 119/165 |
| 4,352,340 | 10/1982 | Strubelt | D30/161 X |
| 4,732,111 | 3/1988 | Runion | 119/165 |
| 5,092,277 | 3/1992 | Baillie et al. | 119/165 |
| 5,361,725 | 11/1994 | Baillie et al. | 119/165 |
| 5,566,640 | 10/1996 | Krumrei | 119/165 |

Primary Examiner—Robert P. Swiatek
Assistant Examiner—Elizabeth Shaw
Attorney, Agent, or Firm—Oppenheimer Poms Smith

[57] ABSTRACT

A cat litter enclosure is provided including a main housing providing an outer box having an entrance at one end enclosing a removable second housing providing an inner box, smaller than the outer box, having an entrance at an end opposite the entrance into the main housing. A path is provided around the inner periphery of the main housing leading from the entrance therein to the entrance in the second housing. A removable cat litter pan is disposed within the second housing. The path may be carpeted and, since a cat must move along the path to enter the second housing where the cat litter pan is, and retrace its path, its paws will be cleaned of litter and other debris when the cat exists the main housing.

12 Claims, 2 Drawing Sheets

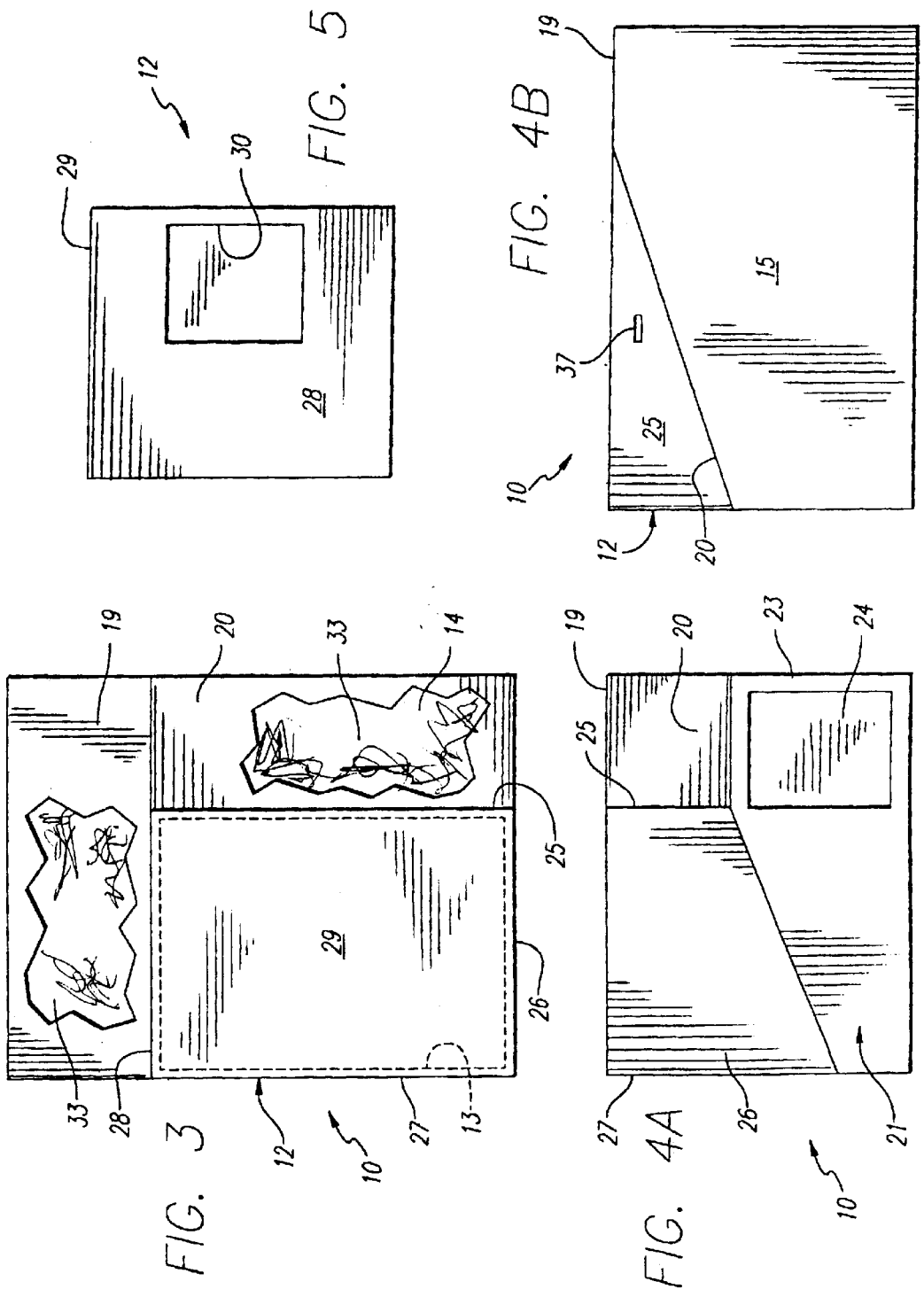

CAT LITTER ENCLOSURE

BACKGROUND OF THE INVENTION

1. Field of the Invention

The invention relates to cat litter enclosures; and, more particularly, to such an enclosure which automatically cleans the paws of a cat using the same.

2. Description of Related Art

Cats are extremely popular house pets but, if kept inside, it is necessary to maintain some sort of cat litter pan or the like in one's house or apartment. Many types of cat litter devices have been proposed over the years to deal with the problem of odors, removal of feces and urine, cost, absorbency, etc. Recently, clumping-type cat litter has become very popular which clumps up when used by the cat. The feces and urine deposited by the cat can then be scooped out using a strainer-type shovel or the like and the clumps are then discarded. The remaining cat litter may be replenished and reused thus saving costs. One of the problems with all types of commercial cat litters, and particularly the clumping type, is that the loose particles of litter or the clumped material adheres to the paws of the cat after the cat leaves the litter box. This litter is then deposited outside of the litter box soiling the floors and rugs of the house or apartment of the cat owner.

There is thus a need for a cat litter enclosure which cleans a cat's paws before it leaves the litter enclosure.

SUMMARY OF THE INVENTION

It is an object of this invention to provide a cat litter enclosure for containing therein cat litter which enclosure cleans the paws of a cat of litter or debris before the cat leaves the litter enclosure.

It is a further object of this invention to carry out the foregoing object economically and in a manner which cuts down on cat litter odors and retains the cat litter inside the enclosure.

These and other objects are preferably accomplished by providing a cat litter enclosure which includes a main housing providing an outer box having an entrance at one end enclosing a removable second housing providing an inner box, smaller than the outer box. The second housing has an entrance at an end opposite the entrance into in the main housing. A path is provided around the inner periphery of the main housing leading from the entrance therein to the entrance in the second housing. A removable cat litter pan is disposed within the second housing. The path may be carpeted and, since a cat must move along the path to enter the second housing where the cat litter pan is, and retrace its path, its paws will be cleaned of litter and other debris when the cat exits the main house.

BRIEF DESCRIPTION OF THE DRAWING

FIG. 3 is a top plan view of the enclosure of FIG. 1 with a portion of the roof of the outer housing broken away for purposes of illustration;

FIG. 4A is a front elevational view of the enclosure of the invention;

FIG. 4B is a side elevational view of the enclosure of FIG. 1; and FIG. 5 is an elevational view of second housing 12 showing the rear wall thereof.

DESCRIPTION OF THE PREFERRED EMBODIMENT

Figure 1:
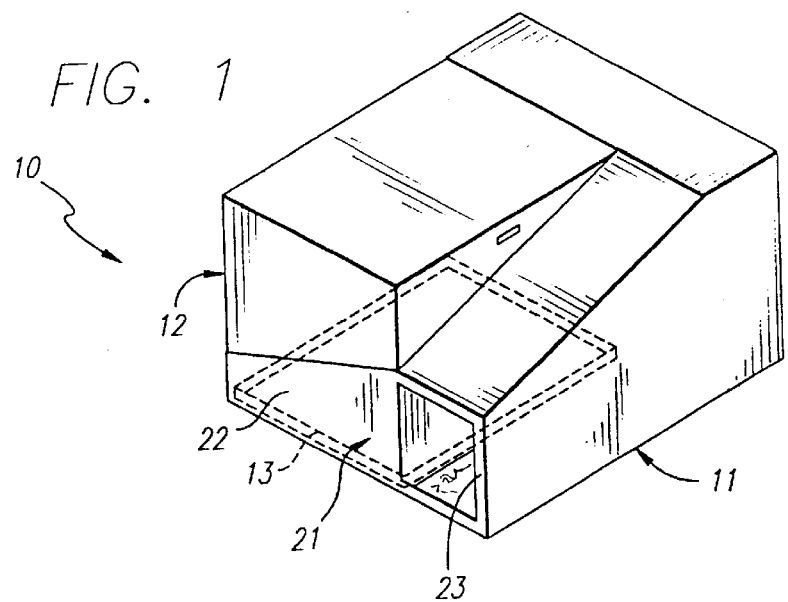
FIG. 1 is a perspective view of a cat litter enclosure in accordance with the teachings of the invention.

Referring now to FIG. 1 of the drawing, FIG. 1 shows the assembled cat litter enclosure 10 in accordance with the invention. Enclosure 10 is comprised of three basic parts; a main outer housing 11, (see FIG. 2) an inner housing 12 and a cat litter pan 13 shown disposed internally of outer housing 11.

Figure 2:
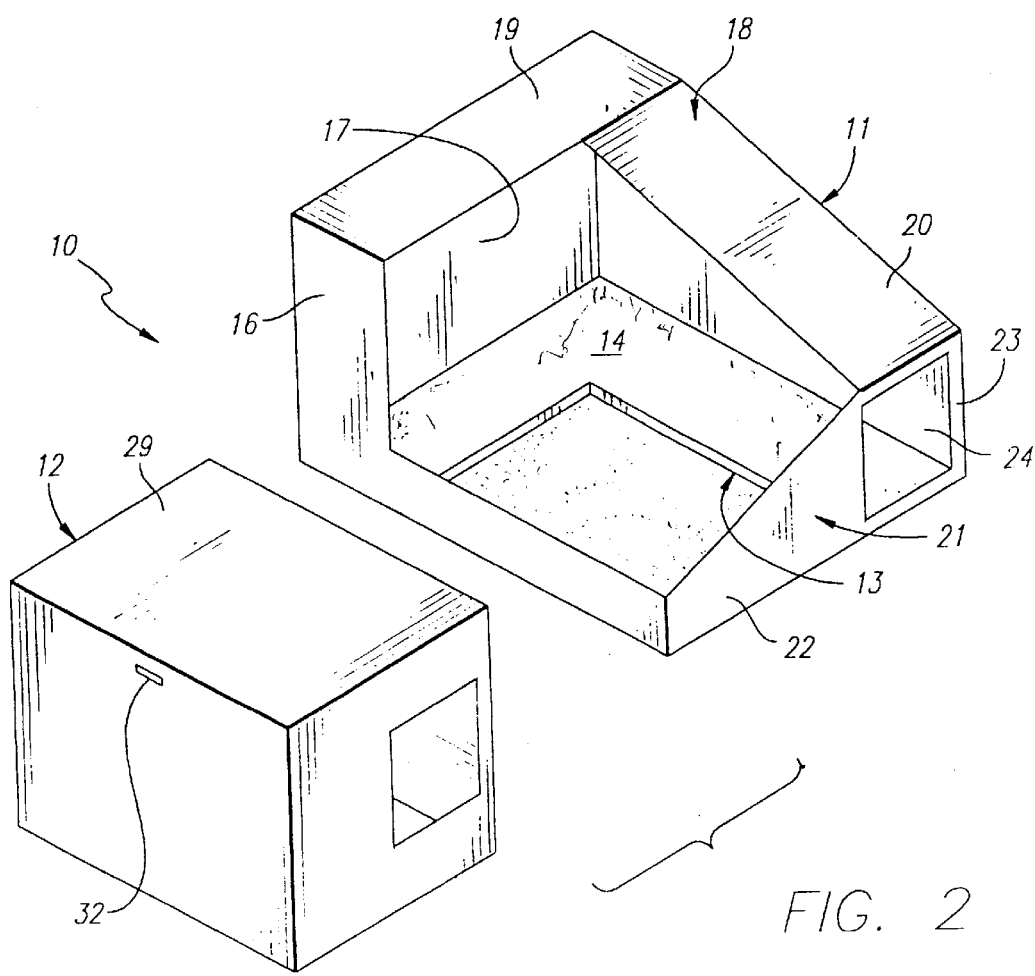
FIG. 2 is an exploded view of the enclosure of FIG. 1 showing a cat litter pan disposed inside of the outer housing.

As seen in FIG. 2, outer housing 11 has a base or floor 14, an upstanding right side wall 15 (FIG. 4B), a spaced upstanding left side wall 16 (FIG. 2) which is L-shaped, a plan or rear wall 17, and an L-shaped top wall 18.

As also seen in FIGS. 4A and 4B, top wall 18 has two portions, a first portion 19 running along the top of rear wall 17 and a sloping portion 20 running along the top of side wall 15 (sloping from its intersection with portion 19).

As seen in FIGS. 1 and 2, the front wall 21 of the outer housing 11 has a first trapezoidal portion 22 running along the lower front of housing 11 and a second elongated leg portion 23 extending vertically along side of portion 22 from bottom wall 14 to top wall 18 (intersecting with sloping portion 20). An opening 24 is provided in portion 23 spaced from bottom wall 14.

Second housing 12 is a box-like structure having an open bottom surrounding by interconnected side walls 25 to 28 (see FIG. 3) closed off at top by top wall 29. An opening 30 (FIG. 5) is provided in rear wall 28 of second housing 12.

As seen in FIGS. 2 and 4, cut-out 37 may be provided in side walls 27, 25, respectively, to provide handles for lifting second housing 12 out of first housing 11. Also as seen in FIG. 3, housing 12 fits snugly within housing 11 between front wall portion 22, inside wall 16 and the inner edge of top wall 18 of housing 11. As can be appreciated from viewing FIGS. 1 and 3, the opening 30 in second housing 12 is toward the rear wall 17 of housing 11 (and, thus, opposite opening 24).

As seen in dotted lines in FIG. 3, and in FIG. 2, cat litter pan 13 is disposed on the floor 14 of outer housing 11 in a position within the open bottom of inner housing 12. Also, as seen in FIGS. 2 and 3, carpeting 33 may be provided on bottom wall 14 extending about inner housing 12 as clearly seen in FIG. 3.

Assembly of enclosure 10 of FIG. 1 is simple. The cat litter pan 13 is disposed internally of outer housing 11 on bottom wall 14 and filled with any suitable cat litter. This pan 13 is positioned in the area where the open bottom of inner housing 12 will be placed (and is defined by the area surrounded by carpeting 33—FIG. 3). Of course, if carpeting is not used, indicia may be provided on bottom wall 14 for proper placement of pan 13.

The open bottom of inner housing 12 is now placed over on top of pan 13 with opening 30 (FIG. 1) to the rear of outer housing 11. The final assembled portion is shown in FIG. 1.

In order to use litter pan 13, the cat must enter opening 24, walk around carpeting 33 and enter opening 30 leading into the interior of second housing 12 (and, thus, to litter pan 13). When the cat is finished, it must retrace its path out of opening 30, along carpeting 33 and out of opening 24.

Carpeting 33 may be any suitable roughened surface or material, such as regular, rough or shag carpet material, astroturf material, toweling material, etc., as long as it removes the granules of litter material on the paws of the cat as it traverses the carpeting 33. Such carpeting 33 may be removable for cleaning, if desired.

Pan 13 may be of any suitable material, such as plastic, metal, etc., and may have 4 interconnected side walls surrounding a bottom wall. Housings 11, 12 may be made of any suitable materials, such as stiff cardboard, wood, plastic, etc. Inner housing 12 is removable via handles 31, 32 for access to litter pan 13 and easy cleaning of the entire disclosure.

Any suitable configuration may be used for housing 11, 12 in order to carry out the teachings of the invention. Any suitable dimensions may be used. For example, outer housing 11 may be about 24" wide at the front and about 29½" deep with an overall height of about 17". Inner housing 12 may be about 16" wide at the front, about 20½" deep and about 17"high. The opening 30 may be about 6" from the bottom. Opening 24 may be about 1" from the bottom. Both openings may be about 7"×9" in width and length. Again, these dimensions may vary.

It can be seen I have disclosed a cat litter enclosure which must be used by a cat in a way that cleans its paws of litter material and other debris. Another advantage of this arrangement is that odors are diminished since such odors are baffled due to the inner wall arrangement of the two housings.

Although a specific embodiment of the invention is disclosed, variations thereof may occur to an artisan and the scope of the invention should only be limited by the scope of the appended claims.

I claim:

1. A cat litter enclosure comprised of:
   a first outer housing having a bottom wall surrounded by interconnected side walls forming a first enclosure;
   a second inner housing removably mounted internally of said first outer housing having an open bottom formed by a plurality of interconnected side walls closed off by a top wall forming a second enclosure;
   an opening through one of the side walls of said outer housing leading into the interior thereof; and
   an opening through one of the side walls of said inner housing leading into the interior thereof, said opening through one of the side walls of said inner housing being spaced from the opening through one of the side walls of said outer housing when said inner housing is mounted internally of said outer housing.

2. In the enclosure of claim 1 including a cat litter pan mounted on the bottom wall of said outer housing within the open bottom of said inner housing when said inner housing is mounted in said outer housing whereby a cat, when using said litter pan, enters said outer housing through said opening therein, travels a path along the bottom wall of said outer housing to the opening in said inner housing onto said pan, then traverses said path to exit out of said outer housing.

3. In the enclosure of claim 2 wherein said path is covered by a roughened material.

4. In the enclosure of claim 3 wherein said path is covered by carpet material.

5. In the enclosure of claim 1 wherein said opening through said inner housing is opposite the opening through said outer housing.

6. In the enclosure of claim 1 wherein said outer housing is generally rectangular having a rectangular bottom wall surrounded by four interconnected side walls, one side wall of said outer housing being generally trapezoidally-shaped sloped at the top, a second side wall of said outer housing connected to said one side wall forming a planar or back wall, a third side wall of said outer housing forming an L-shaped side interconnected to said second side wall and a fourth side wall of said outer housing providing a front wall for said outer housing having a first trapezoidally-shaped portion connected to said third side wall and a second elongated vertical portion connected to both said first trapezoidally-shaped portion and said first side wall, said vertical portion having said opening therein leading into the interior of said first enclosure, and an L-shaped top wall closing off said first outer housing extending from said vertical portion along the upper end of said one side to said back wall and said third side wall.

7. In the enclosure of claim 6 wherein said inner housing is generally rectangular having 4 interconnected side walls closed off by said top wall thereof, said inner housing being mounted within said outer housing having its open bottom disposed on the bottom wall of said outer housing between the top wall, front wall, back wall and third side wall of said outer housing.

8. In the enclosure of claim 7 wherein said opening through said inner housing faces the back wall of said outer housing.

9. In the enclosure of claim 8 wherein the space on the bottom wall of said outer housing between said inner housing and the inner walls of said outer housing between the openings therein are covered with a rough material.

10. In the enclosure of claim 9 wherein said rough material is carpeting.

11. In the enclosure of claim 7 wherein handle portions are provided in two oppositely disposed side walls of said inner housing adjacent the top wall thereof.

12. In the enclosure of claim 11 wherein said handle portions are provided by cut-outs through said oppositely disposed side walls.

\* \* \* \* \*